(12) United States Patent
Vallée

(10) Patent No.: US 7,910,006 B2
(45) Date of Patent: Mar. 22, 2011

(54) METHOD FOR ELECTROMAGNETIC TREATMENT OF WATER CONFERRING A BIOLOGICAL ACTIVITY THEREON

(76) Inventor: Philippe Vallée, Paris (FR)

( * ) Notice: Subject to any disclaimer, the term of this patent is extended or adjusted under 35 U.S.C. 154(b) by 1036 days.

(21) Appl. No.: 11/587,656

(22) PCT Filed: Apr. 29, 2005

(86) PCT No.: PCT/FR2005/001080
§ 371 (c)(1),
(2), (4) Date: Mar. 20, 2007

(87) PCT Pub. No.: WO2005/115921
PCT Pub. Date: Dec. 8, 2005

(65) Prior Publication Data
US 2007/0221577 A1  Sep. 27, 2007

(30) Foreign Application Priority Data

Apr. 29, 2004 (FR) .................. 04 04588

(51) Int. Cl.
*A61L 2/14* (2006.01)
*C02F 1/48* (2006.01)

(52) U.S. Cl. .............. 210/695; 210/748.01; 210/748.16; 210/748.19; 210/222; 210/243; 422/186.01; 422/186.07; 204/155; 204/554; 204/555; 204/557; 204/564; 204/565; 204/568; 204/663; 204/664

(58) Field of Classification Search ................ 210/695, 210/748, 222, 243, 748.01, 748.16, 748.19; 204/155, 554, 555, 557, 564, 565, 568, 663, 204/664; 422/186.03, 186.07
See application file for complete search history.

(56) References Cited

U.S. PATENT DOCUMENTS 5,326,446 A  7/1994  Binger
5,939,030 A * 8/1999  Moxley et al. ............ 204/554

FOREIGN PATENT DOCUMENTS

WO    WO 02/058449    8/2002

* cited by examiner

*Primary Examiner* — David A Reifsnyder
(74) *Attorney, Agent, or Firm* — Young & Thompson

(57) ABSTRACT

The water is at the origin of an entire series of geological and climatic processes and is primarily the basis of all forms of life. Actually, it is the majority component of all living organisms (50% to 98%); the human body contains 70% of the total mass thereof. The biosphere in its entirety consists of 80% water. Although this may be one of the most highly examined liquids, its properties comprising numerous anomalies have not yet all been elucidated. It plays an essential role in the structure and metabolism of all living beings. This biological role is due to its physical and chemical properties that are out of the ordinary. Bernal and Flower established a rule defining that each oxygen atom has two hydrogen atoms as neighbors and each hydrogen bond contains one hydrogen atom. The separation of the liquid water molecules produces the formation of hydroxyl ion ($OH^-$) and hydronium ions ($H_3O^+$), which hampers this rule. The appearance of $OH^-$ and $H_3O^+$ ions produces "ionic defects" in the structure of the water (Bernal, J. and Fowler, R. (1933). "A Theory of Water and Ionic Solution, with Particular Reference to Hydrogen and Hydroxyl Ions." Journal of Chemical Physics 1(8): 515-548). In the absence of an electric field, there is an equilibrium between the hydroxyl ions and the hydronium ions. If an electromagnetic field that polarizes in water is sent on, these two ions move independently and the equilibrium is broken. These ionic compounds can go to be adsorbed, for example, on colloidal particles.

10 Claims, 5 Drawing Sheets

Fig:1 :
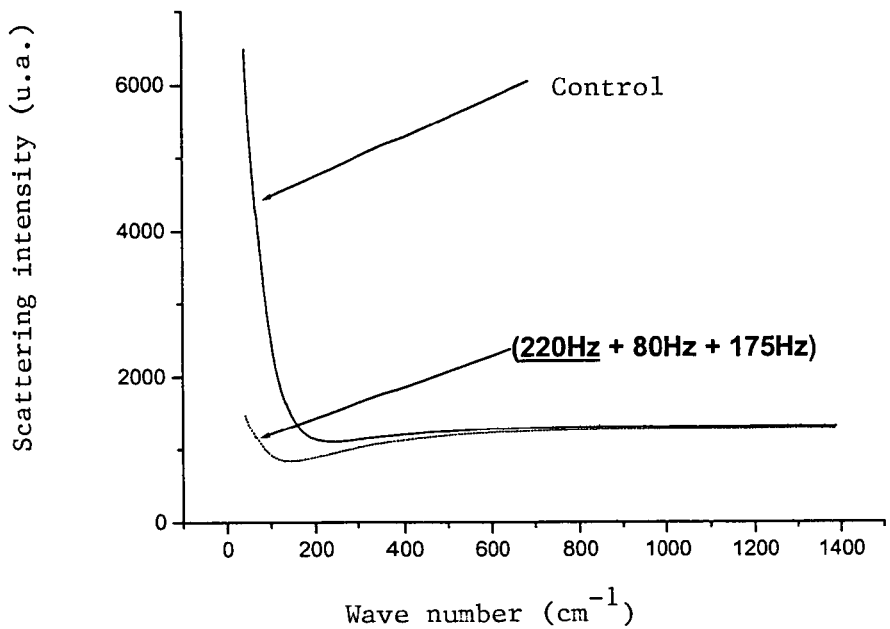
Fig: 2 :
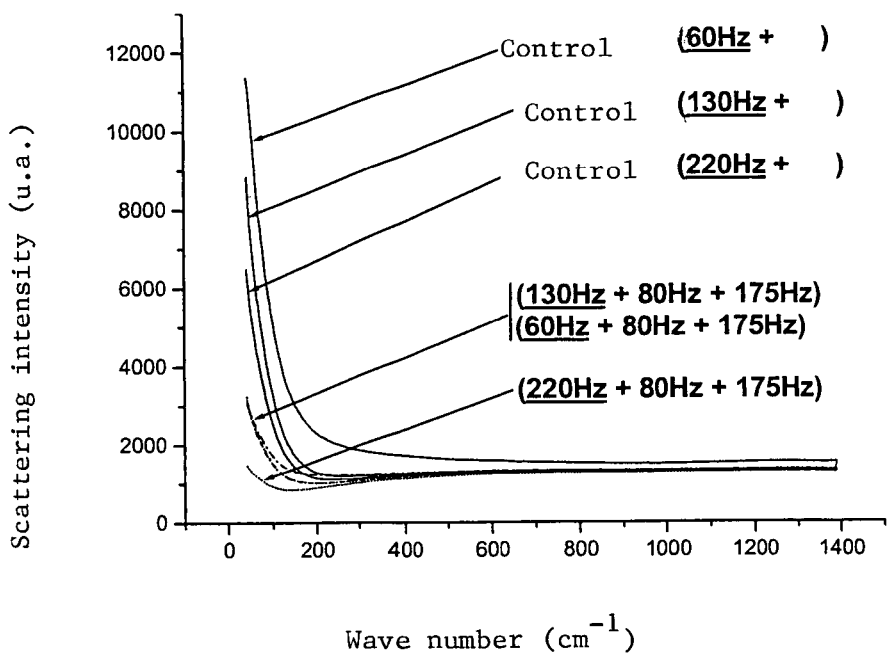

Fig: 3 :
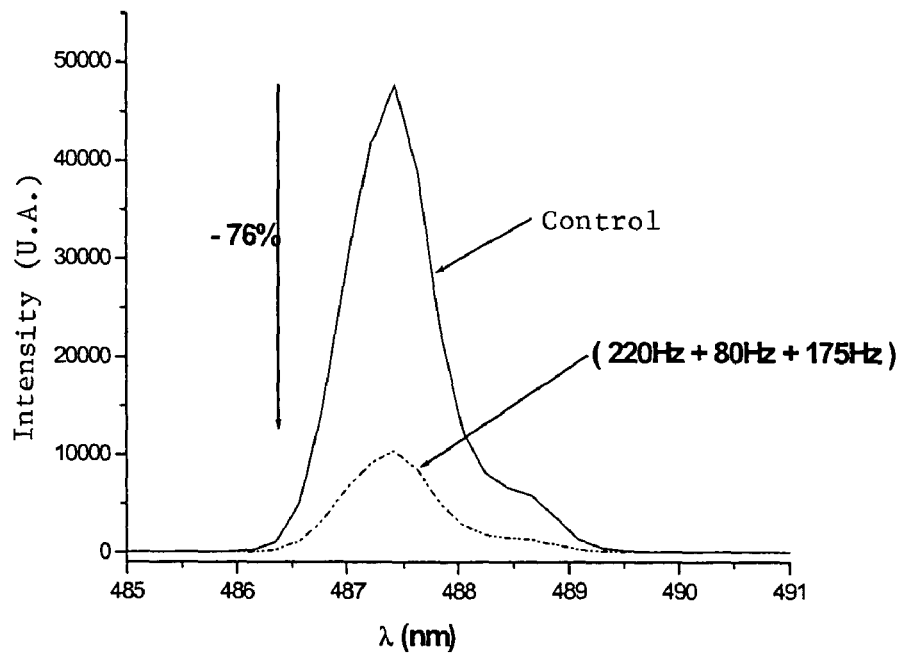
Fig: 4 :
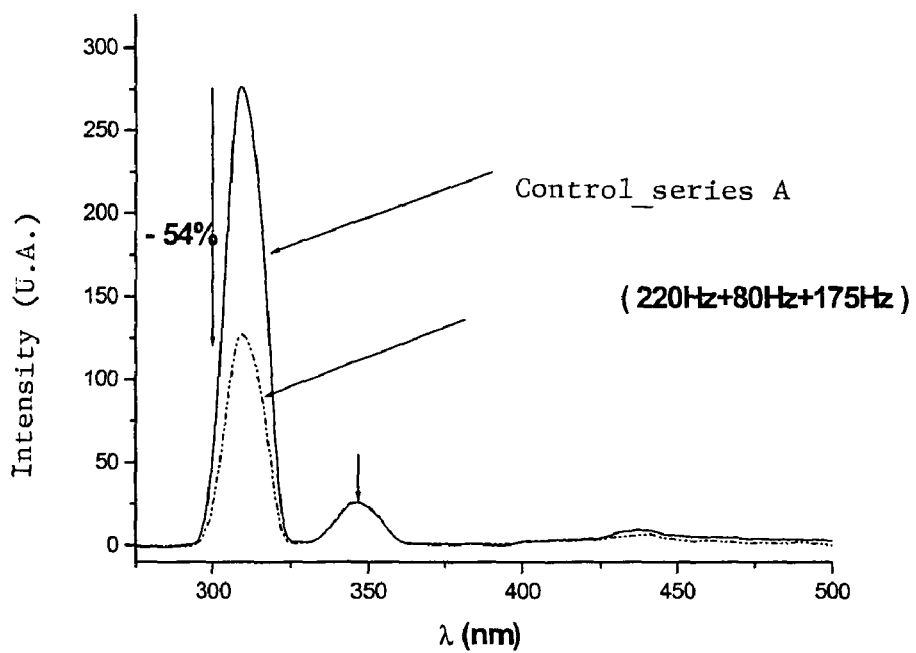

Fig: 5 :
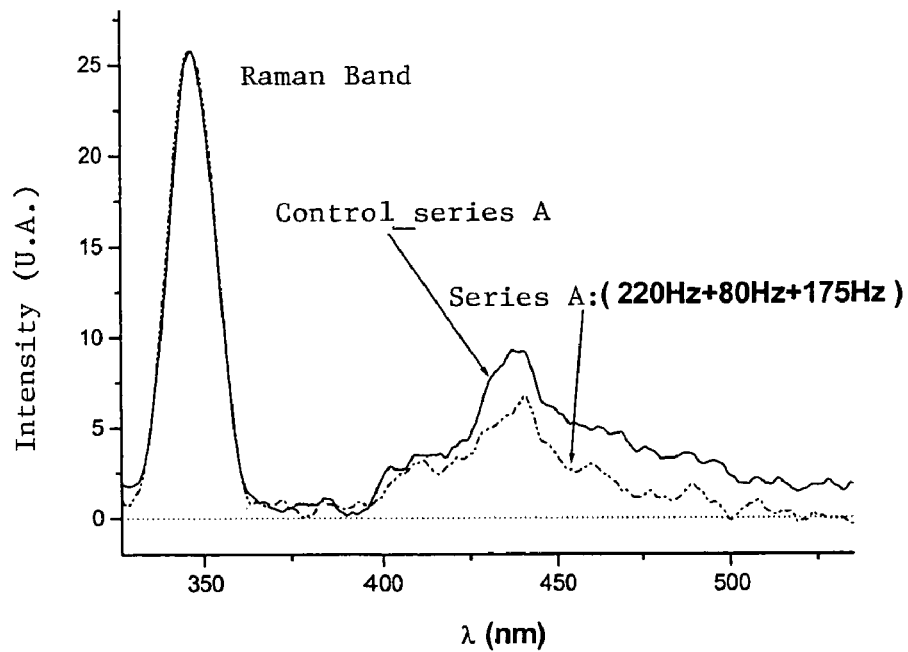
Fig: 6 :
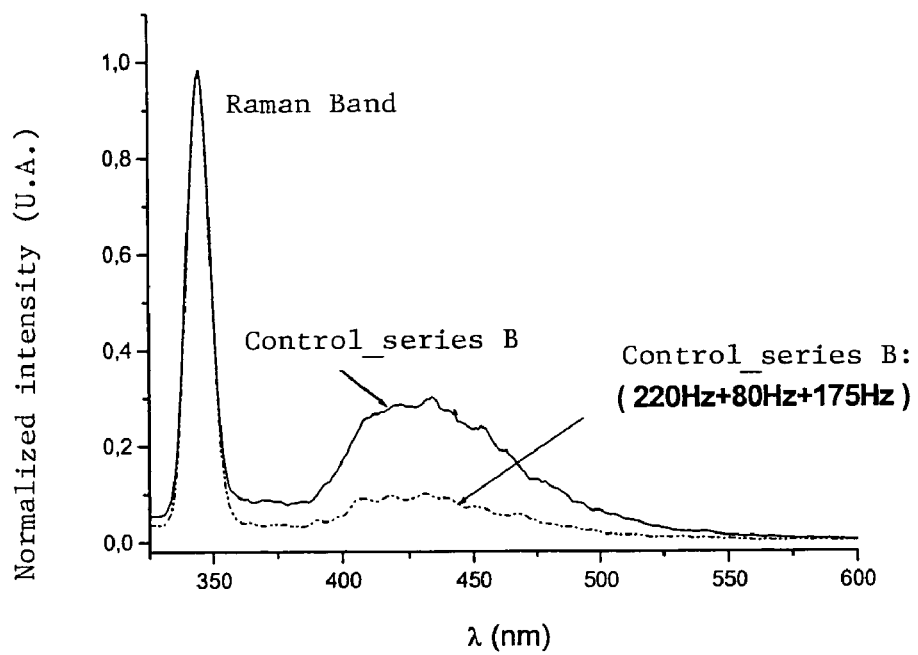

Fig: 7 :
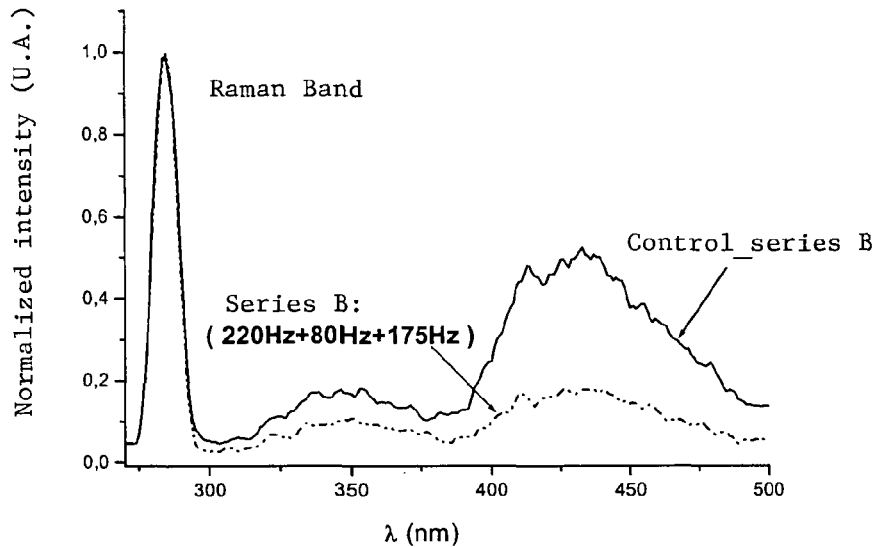
Fig: 8 :
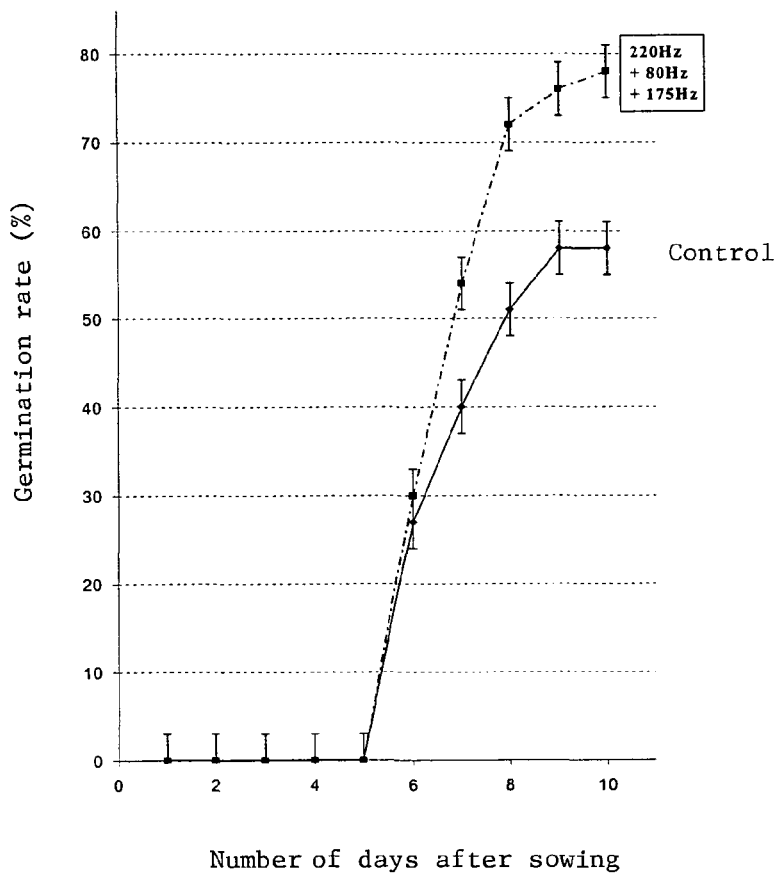
Number of days after sowing

Fig: 9 :
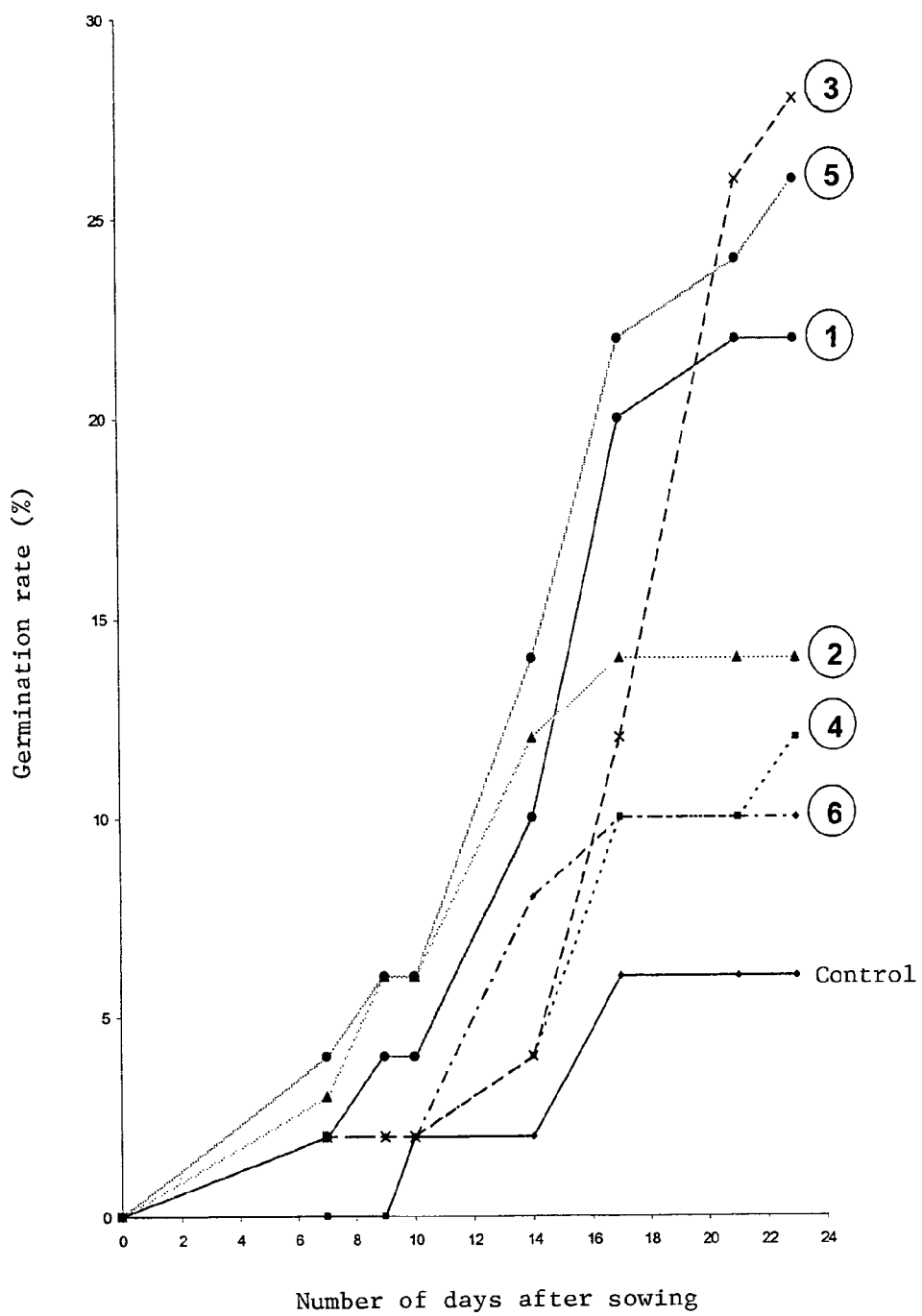

METHOD FOR ELECTROMAGNETIC TREATMENT OF WATER CONFERRING A BIOLOGICAL ACTIVITY THEREON

This invention relates to a process for physical treatment of water to impart to it physico-chemical properties (among other things: modification of intrinsic luminescence, of the Zeta potential) and specific biological properties. More specifically, it makes it possible to acquire, on the one hand, a biological activity (such as, for example, the acceleration of the growth of vegetables) and, on the other hand, to improve the bioavailability and the effectivenesss of weakly-diluted active ingredients as well as to remove pollution from various types of water, whether they are obtained from traditional distribution circuits or from upstream, within the framework of traditional sewage purification plants.

The water is at the origin of an entire series of geological and climatic processes and is primarily the basis of all forms of life. Actually, it is the majority component of all living organisms (50% to 98%); the human body contains 70% of the total mass thereof. The biosphere in its entirety consists of 80% water. Although this may be one of the most highly examined liquids, its properties comprising numerous anomalies have not yet all been elucidated. It plays an essential role in the structure and metabolism of all living beings. This biological role is due to its physical and chemical properties that are out of the ordinary. Bernal and Flower established a rule defining that each oxygen atom has two hydrogen atoms as neighbors and each hydrogen bond contains one hydrogen atom. The separation of the liquid water molecules produces the formation of hydroxyl ion ($OH^-$) and hydronium ions ($H_3O^+$), which hampers this rule. The appearance of $OH^-$ and $H_3O^+$ ions produces "ionic defects" in the structure of the water (Bernal, J. and Fowler, R. (1933). "A Theory of Water and Ionic Solution, with Particular Reference to Hydrogen and Hydroxyl Ions." Journal of Chemical Physics 1(8): 515-548). In the absence of an electric field, there is an equilibrium between the hydroxyl ions and the hydronium ions. If an electromagnetic field that polarizes in water is sent on, these two ions move independently and the equilibrium is broken. These ionic feedstocks can go to be adsorbed, for example, on colloidal particles.

The zeta potential is defined as the electric potential that corresponds to the potential difference between the Stern layer that consists of ions adsorbed on the particle and the diffuse layer that consists of counter-ions. The colloidal substances can be defined, for example, as being micrometric or nanometric particles, microorganisms, cells, or else gas bubbles having been formed in water. The more the zeta potential is raised to the surface of the colloids, the greater the electric potential around these particles. Several works seem to indicate that the electromagnetic treatment would reduce the zeta potential, whether with an electric field of 44 MHz (Chibowski, E., Holysz, L. and Wojcik, W. (1994) "Changes in Zeta Potential and Surface-Free Energy of Calcium Carbonate Due to Exposure to Radiofrequency Electric Field." Colloids and Surfaces A: Physicochemical and Engineering Aspects 92: 79-85) or a static magnetic field with an intensity of greater than 0.3 T (Higashitani, K.; Iseri, H.; Okuhara, K.; Kage, A. and Hatade, S. (1995) "Magnetic Effects on Zeta Potential and Diffusivity of Nonmagnetic Colloidal Particles." Journal of Colloid and Interface Science 172(2): 383-388). The adsorption of ionic feedstocks (such as the ions $OH^-$, $HCO_3^-$ and $CO_3^{2-}$) on the gas bubbles can generate the formation of aggregates, referred to as clusters of ionized water molecules as counter-ions at the water/gas interfacial layer.

To date, in fact, the addition of chemical substances as surfactants (for example, polyethylene glycol ester) is now used to modify the polarization of the cell membrane. This technique produces secondary effects due to the chemical substances that are used.

In the standard procedures of water purification, chemical substances such as chloride or ozone are now used that can produce derivative substances having important secondary effects.

Other side effects are observed with the biologically active chemical substances that are used whether in the medical framework or in that of the environment (pesticides).

The invention has as its object to propose a process for water treatment that avoids the preceding drawbacks.

The invention has as its object a process for water treatment for making it biologically active that comprises the following steps:

Take water for domestic use,
Purify the water,
Bring the water into the presence of gas and/or aerosols in a chamber of pure silica,
Apply a pulsed, alternating magnetic field to the water during first time periods, of adjustable length, whereby the characteristics of the magnetic field are constant for each first time period and vary from one first period to the next,
Apply a pulsed, alternating electric field to the water during second time periods, of adjustable length, whereby the characteristics of the electric field are constant for each second time period and vary from one second period to the next,
Use of the thus treated water for a biological application.

According to other characteristics:

The gases are classified in the following group: nitrogen, oxygen, carbon dioxide, a neutral gas such as nitrogen, hydrogen, pure or in a mixture and introduced at a pressure and at a temperature of more than those of the water,
The aerosols are classified in the group of mineral or organic substances that have a biological action to potentialize, preferably: solution of colloidal substances, of anti-oxidants, of vitamins, of amino acids, of omega-3 fatty acids, or hydro-alcoholic solution of essential oils,
The content of the mineral or organic substances is preferably between 1 ppt and 1000 ppm; whereby the degree of hygrometry in the chamber is between 40 and 100% and is defined according to the activity of the water of said substances,
The magnetic field has an intensity of between 0.01 G and 10 KG, and the electric field has an intensity of between 1 V/m and 1 KV/m,
The magnetic and electric fields have a frequency of less than 50 KHz and preferably of less than or equal to 25 KHz,
The first and the second time periods have a duration of an adjustable length of between 1 second and 24 hours,
The first time periods and the second time periods are of the same duration or of different durations,
In addition, the process comprises a stage that consists in subjecting the water to a preferably polarized electromagnetic radiation whose spectrum extends from ultraviolet to infrared, and whose intensity is at least equal to 1 mW/cm$^2$,
The water for domestic use has a pressure of more than 3 bar, and it is purified until its resistivity is 18.2 MOhm-s.cm at 25° C. and its total content of organic compounds is less than 30 ppb, preferably less than 1 ppb, whereby the last purification stage is an ultrafiltration with a cut-off threshold that is at most equal to 13,000 Daltons.

Advantageously, the gases comprise a neutral gas such as argon in a proportion of 0.1 to 90% of total volume and carbon dioxide in an amount of between 20 and 3,500 ppm, and the chamber where the preparation is carried out is of pure silica so as to release only the colloidal silica into the purified water and, if necessary, to add to it.

Other advantages, characteristics and details will emerge more clearly with the following explanatory description given with reference to the accompanying figures.

By way of example, various results illustrating the action of the electromagnetic treatment on the water were shown:

FIG. 1: Spectra of elastic and inelastic scattering of the light ("low-frequency" Raman scattering) of the control water and the treated water, FIG. 2: Spectra of elastic and inelastic scattering of the light ("low-frequency" Raman scattering) of the control water and the treated water, according to three different embodiments of treatment, FIG. 3: Spectra of elastic scattering of the light at 488 nm (normalized on the Raman band) of the treated water compared to the control water, FIG. 4: Spectra of elastic scattering of the light at 310 nm (normalized on the Raman band toward 345 nm) of the control water and the treated water in the test series A, FIG. 5: Spectra of photoluminescence excited at 310 nm (normalized on the 345 nm Raman band) of the control water and the treated water of the test series A, FIG. 6: Spectra of photoluminescence excited at 310 nm (normalized on the 345 nm Raman band) of the control water and the treated water of the test series B, FIG. 7: Photoluminescence spectra excited at 260 nm (normalized on the 285 nm Raman band) of the control water and the treated water of the test series B, FIG. 8: Kinetics of the germination rate of leek seeds (incubated at 20° C.) that are watered by the treated water compared to the control water, FIG. 9: Effect of different types of electromagnetic treatments on water being used as a medium to follow the kinetics of the germination rate of dormant oat seeds that are incubated at 30° C.

This invention relates to a process for obtaining water that has specific physico-chemical and biological properties that are linked to the applied physical treatment. Said applied physical treatment is a combination of low-frequency (<50 KHz) and high-frequency (light waves) electromagnetic treatment whose spectral range goes from ultraviolet to infrared, such as, for example, the spectral field of a xenon lamp. The light wave that is used can be a multi-line laser, such as, for example, an argon laser. The approach may be to combine an acoustical treatment of the same frequency range with these magnetic and/or electric fields (composed by a frequency combination).

The electromagnetic treatment is applied to the water by one or more coils, immersed in the latter, or preferably surrounding the container that will preferably be made of pure silica. If another container is used, this will be primarily a synthetic polymer that is transparent to the light spectrum cited in the invention that meets the pharmaceutical standards provided that a methylated silica salt at a content of between 1 ppb and 1000 ppm is added in the purified water. If more than one coil is taken, they will be oriented in a perpendicular or parallel manner according to the desired result. The latter can be solenoids, Helmoltz coils, flat, or toroidal. The signal from the magnetic field is delivered by the coil or coil(s) and is carried out within an electric field, of the same frequency range, preferably alternating, of intensity encompassed between 1 V/m and 1KV/m. There is continuously a static magnetic field corresponding primarily to the geomagnetic field that is added to the pulsed electromagnetic field. The physical treatment is therefore essentially the combination of an electric field and a magnetic field that are pulsed and modulated for a given period of between 1 second and more than 24 hours, according to the treated volume. The waves that are emitted can be waves of triangular, trapezoidal, or helicoidal type or a series of bursts with exponential decline in the form of wave trains; they will preferably be square or sinusoidal and emitted by bipolar pulse. The frequency composition that is used consists of odd and/or even harmonics of the following basic frequencies: 0.1 Hz, 0.25 Hz, 0.333 Hz, 60 Hz, 80 Hz, 130 Hz, 145 Hz, 175 Hz, 220 Hz, 260 Hz, 1 KHz, 1.6 kHz, 2 kHz, 2.2 kHz, 3 kHz, and 50 kHz, as well as sub-multiples and/or multiples of the following frequencies 3.3 Hz, 4 Hz, 7.8 Hz, 9 Hz, 10 Hz, 11 Hz, 14 Hz, 17 Hz, 20 Hz, 24 Hz, 26 Hz, 27 Hz, 33 Hz, 39 Hz, and 45 Hz. The electromagnetic treatment is applied in a well-defined electromagnetic environment (a Faraday cage that has on the inside a double magnetic shielding made of mu-metal as well as a triple acoustical insulation). The frequency composition of the various electromagnetic pulses is optimized for the type of application but preferably remains less than 50 KHz as far as the low-frequency treatment is concerned.

The water is preferably ultra-pure, obtained by a first stage of reverse osmosis then by "polishing" (ion exchange resins, synthetic activated carbon, filters, for example) so as to have a resistivity of 18.2 M$\Omega$.cm at 25° C. and a content of "polluting" organic compounds of less than 30 ppb, preferably less than 1 ppb (free of Dnase, Rnase and endotoxins thanks to an ultra-filter that has a cutoff threshold of at most 13,000 Daltons), conditioned in a silica container in a gas atmosphere of pure water vapor, preferably composed of a gaseous mixture of oxygen at 20.9% and sufficient quantity for ultra-pure nitrogen, filtered at 0.2 µm, controlled (pressure above 1 bar, hygrometric degree preferably encompassed between 40 and 100%), supplemented by carbon dioxide (preferably 20 to 3,500 ppm), argon (preferably between 0.1% and 90% of the total gas content), and, if necessary, hydrogen (or else hydrogen peroxide), the whole mixture protected from natural or artificial light. Other parameters for preparation of water are controlled, such as the temperature of the water that will be encompassed between 0 and 95° C., preferably between 0 and 45° C., and that of the air higher by at least 0.5° C. The water may also be in circulation: it stays for a sufficiently long time in the electromagnetic field, the flow rate is high enough (about on the order of 1.5 l/min) and the rate of the flow is between 0.5 m/s and 5 m/s with an optimum around 3 m/s. So as to enhance the effect of the electromagnetic treatment, a pressurized helicoidal movement will be induced in the water before it undergoes the action of the electromagnetic fields in the treatment chamber. The advantage of this flow system makes it possible to be able to treat larger volumes, but it is necessary to provide synchronization of the pulse trains with the speed and the flow rate as well as to take into consideration the hydrodynamic constraints, the factors for correction of the intensity of the applied fields and the duration of exposure.

It is during this stage for preparation of the water, after degassing if necessary, that one or more substances to be potentialized, previously diluted in pure water, are introduced in the form of aerosols into the chamber for preparation of the water where the degree of hygrometry (or the dew point) will be controlled and well defined according to the active substance. It is useful to manipulate the contact time with the gases that are present in the chamber as well as on the content that is incorporated between 1 ppt and 1000 ppm. The active substances are organic or mineral substances in colloidal form, for example colloidal silica such as the methylated silica salt, or an organic silicon (such as, for example, the monomethyl silane triol).

The thus obtained aqueous solution undergoes the first low-frequency electromagnetic treatment in the Faraday cage and is then, if necessary, treated with a light wave of a primarily coherent nature that is polarized with a frequency on the order of terahertz, such as, for example, the two major lines of 488 nm and 514 mm of an argon laser, at an intensity of at least 1 $mW/cm^2$ and preferably 20 to 150 $mW/cm^2$. The approach may be to carry out the low-frequency and high-frequency (light waves) electromagnetic treatment directly in the gaseous environment before the former dissolves in the ultra-pure water.

The device that makes it possible to obtain the treated water as it was just described could be modified, by necessity for a derived application, in all its dimensions without thereby exceeding the scope of the invention.

So as to illustrate several effects of the electromagnetic treatment on the physico-chemical properties of the water, experimental measures have been carried out. These measures demonstrate a significant reduction in the intensity of the elastic scattering of the light and of the intrinsic luminescence of the water after the electromagnetic treatment.

Actually, the photoluminescence experiment, according to the preparation conditions, made it possible to demonstrate the luminescence inherent to the water of the non-degassed samples. A reduction in this photoluminescence of the samples that have undergone the action of the electromagnetic treatment was observed. In addition, after the pure water is degassed, the effect of the electromagnetic treatment on this luminescence is no longer observed. This luminescence should therefore be linked to the modification of the organization of water molecules at the level of structural defects, which can be bubbles. This photoluminescence experiment, when the object of interest is the wavelength of the excitation light, also becomes an experiment for investigation of the elastic scattering of the light still at 90°. The effect on the elastic scattering of the light may have multiple origins in relation to, in any case, a reduction in the size and/or the number of diffuser elements. These diffusers are gas bubbles of nanometric sizes (from about 200 to 600 nm) that probably are formed around nucleation sites that can be organic compounds. The attachment of the gas molecules around uncharged organic substances does not hamper the mobility or the mass transport of $H^+$ protons that is improved by the electromagnetic field. Also, according to the Laplace Law, the smaller the size of the bubbles, the greater the applied constraints, producing a strong structuring of the water molecules in the form of clusters around these bubbles. Thus, according to the size of the bubbles modified by the electromagnetic treatment, a change in the number of structured water molecules around the latter can be observed. This could be one of the explanations of the effect of the treated water on a biological system.

Within the framework of the invention, organic compounds that have a therapeutic quality, such as, for example, vitamins, omega-3 fatty acids, and essential oils that are dissolved in an ultra-pure hydro-alcoholic solution in the gaseous phase during the preparation of pure water samples, are preferably selected. Colloidal mineral substances that have a therapeutic action, such as, for example, selenium as anti-oxidant, lithium, magnesium, copper, silver, gold, and silica can also be used.

The accumulation of ionic compounds on these gas bubbles by the combined action of the electric field and the magnetic field that are alternating and are pulsed at a modulated duration, applied according to the invention, produces the disturbance of the distribution of the charges and the increase of the electric potential around these nanobubbles up to a breakdown threshold that brings about the collapse of these gas nanobubbles that are present. This collapse can generate the ionization of the gases that are present in the bubble and promote, by recombination, the formation of other chemical radicals such as hydrogen peroxide, hydroxyl radicals, and hydrogen ions, and also increase the bioavailability of ionized water clusters that facilitates extracellular and intracellular exchanges, as well as the biochemical reactions within a living organism such as the human body.

Thanks to the combination of pulsed electric and magnetic fields, the invention makes it possible to bring about an accumulation of charges at the surface of any spheres such as cells or bubbles of gas that are present in the aqueous solution without resorting to the addition of surfactants or by reducing their concentrations. The process makes possible, among other things, the formation of negative ions, of ionized water molecule clusters. Promoting the extracellular and intracellular exchanges, this water accelerates the natural growth of the plants and can be applied to any type of agriculture.

This invention can be considered to be a new technical process for purification of the water of various potential contaminants, such as all types of micro-organisms, without the secondary effects of chemical substances that are usually used, such as ozone and chlorine.

Other applications may result in the agronomical and food processing field (acceleration of the growth of plants, better bioavailability of the active ingredients that are diluted in water), in the field of the environment (removal of pollution of water by making it biocompatible, action on the water vapor of, for example, cooling towers), in the field of cosmetics (for example for obtaining a better hydrating capacity of an emulsion), in the veterinary and medical field (better bioavailability of active ingredients diluted in the treated water, for example as water of hemodialysis). Within the framework of cosmetic application, other hydrating components, such as emollients, moisturizers, occlusive agents or else anti-oxidants, can be integrated into the formulation of any galenical form incorporating treated water and may be suitable for topical application on the skin.

This invention also makes it possible to reduce the concentration of biologically or chemically active substances while increasing their effectiveness, regardless of their use: water treatment, medical and veterinary field, cosmetic field, agricultural field (phytosanitary products).

These different examples are there only for illustrating the extent of the fields of application and are not comprehensive.

Presentation of several results and examples of applications:

Different types of electromagnetic treatments are shown here by way of example:

A type of treatment consisting of sinusoidal pulses of 220 Hz alternating every 10 seconds with sinusoidal pulses that are pulsed at 80 Hz for 3 hours, then a sinusoidal pulse at 175 Hz for 3 hours. The electromagnetic field that is present at the center of the coil is on the order of about 10 Gauss, with a static magnetic field of about 10 µT and an electric field E that is pulsed at 50 Hz from about 10 V/m. The action of this type of treatment will be followed by differentiation of the control water and the treated water by 3 characterization techniques: the elastic scattering of the light, the photoluminescence and a biological test: the germination of seeds (cf. FIGS. 1 to 8).

Other types of treatments of the water are studied on the germination of dormant oat seeds (cf. FIG. 9):
1. Sample 1: Square wave of 1 kHz, B=4.2 G, duration: 2 hours and 5 minutes, vertical coil.
2. Sample 2: Sine wave of 2 kHz modulated by 4-second square pulses every 12 seconds, B=0.46 G, horizontal coil perpendicular to the geomagnetic field for 2 hours and 5 minutes.
3. Sample 3: Sine wave of 2 kHz, 3×30 seconds of action, then 3×30 seconds of rest, B=14 G, vertical coil.
4. Sample 4: Sine wave of 50 Hz, 3×30 seconds of action, then 3×30 seconds of rest, B=14 G, vertical coil.
5. Sample 5: Sine wave of 2 kHz modulated by 3-second square pulses every 13 s, B=0.46 G, duration 3 hours and 30 minutes, horizontal coil perpendicular to the geomagnetic field.
6. Sample 6: Sine wave of 2 kHz, 3×30 seconds of action, then 3×30 seconds of rest, B=23 G, vertical coil.

Spectra of inelastic and elastic scattering of the light that are obtained after electromagnetic treatment:

The spectra of inelastic scattering (Raman scattering) were recorded at a wavelength of 488 nm at a power of 100 mW on a water sample at 25° C. with a resistivity of 18.2 MΩ.cm prepared in a mixture of ultra-pure air that was composed of, among others, 20.9% of oxygen qsp for nitrogen, in 3 measurement ranges: low frequency: 30 to 1300 $cm^{-1}$, middle frequency: 1300 to 2400 $cm^{-1}$, high frequency: 2800 to 3750 $cm^{-1}$.

At high frequencies, the bands 3200 and 3400 $cm^{-1}$ are currently defined as corresponding respectively to the vibration of symmetrical and asymmetrical elongation of the OH bond of the water molecule. At these two bands, no difference was measured in the Raman scattering intensity between the reference water and the treated water, nor any shift in the position of these bands. It is the same at the middle frequencies: the band 2120 $cm^{-1}$ is in general attributed to the additive combination of the band of 1640 $cm^{-1}$ (angular deformation of HOH of the water molecule) and the band of 480 $cm^{-1}$ associated with intermolecular vibration modes.

In contrast, at low frequencies, a significant reduction in the relative scattering intensity $[(I_{(treated)} - I_{(control)})/I_{(control)} * 100]$ is observed on the water sample that has undergone the electromagnetic treatment from −73% to 60 $cm^{-1}$ (energy combined with the angular vibration band of the intermolecular OH bond) and from −32% to 170 $cm^{-1}$ (energy combined with the vibration band for elongation of the intermolecular OH bond), (cf. FIG. 1).

The first frequency of 220 Hz was replaced by the frequency of 60 Hz in a first step, then by 130 Hz in the frequency composition of the first type of treatment. A more significant reduction of the scattering was observed with the electromagnetic treatment that uses the frequency 220 Hz (cf. FIG. 2). This experiment made it possible to observe the effect of treatment frequencies selected on the same type of water prepared under the same conditions. The scattering that is observed here is, in reality, the sum of the Raman scattering and the elastic scattering of the light (due to the poor elimination of the Rayleigh scattering). This is why experiments for elastic scattering of the light were carried out so as to duly isolate and to identify the action of the applied electromagnetic fields (cf. FIG. 3).

Measurement of photoluminescence in two series of samples A and B:

Two sets of experiments were carried out on two different pieces of spectroscopy equipment. The sample of the series A (measured 24 hours after treatment) was analyzed on a less efficient device, but it has the advantage of showing on the same spectrum the significant reduction (−54%) in the scattering of the light with 310 nm of the treated sample comparatively to the control, whereas no difference at the Raman band is observed here toward 345 nm (cf. FIG. 4). A zoom of this spectrum at the Raman band (cf. FIG. 5) makes it possible to observe a slight reduction in the luminescence band toward 440 nm for the treated sample that is excited at 310 nm.

In the series B, certain defined conditions for preparing the water have been changed in the following way: a gaseous mixture that consists of oxygen, nitrogen, argon and a volatile organic compound, total organic compound #1 ppm, $CO_2$ #300 ppm, pH=5.9, hygrometry #60%, overpressure of the water in the network during the preparation #6 bar, temperature difference between the air and the water of about 1° C., oxygen content of the water 2 ppm, ultra-pure water is filtered with a terminal ultrafilter eliminating all of the compounds with a molecular weight of more than 13,000 Daltons.

After the water samples are excited at 310 nm, a luminescence band is also observed that represents an intensity of about 30% of the Raman band. The tip of this luminescence band is around 425 nm (cf. FIG. 6). After electromagnetic treatment, a strong reduction in the intensity of this intrinsic luminescence of about 65% is found. After excitation at 260 nm (cf. FIG. 7), two broad bands are identified, one centered toward 345 nm with an intensity of 20% of that of the Raman band and the other toward 425 nm with an intensity of 55% of that of the Raman band. After electromagnetic treatment, a strong reduction in the luminescence intensity of 64% of the band centered at 425 nm is also observed.

This attenuation of the luminescence of the water can be explained by the action of the electromagnetic fields on the structural defects of the organization of the water molecules due to the presence of nanobubbles. As for the sono-luminescence, the formation of different derivative reactive radicals (such as the superoxide ions, the hydroxyl radicals, hydrogen peroxide, for example) can be observed.

After the water is degassed, the effect of the action of the electromagnetic treatment on the elastic scattering of the light as well as on the luminescence of the samples is no longer observed. Under the preparation conditions cited above, the possible residual ionic or organic impurities in these water samples that have a resistivity of 18.2 MOhms.cm at 25° C. can induce neither scattering nor the observed photoluminescence; the latter could then be obtained from gas nanospheres in suspension in the water. Their size and their dispersion would depend primarily on operating conditions and environmental conditions linked to the preparation of the water (temperature, pressure, gas).

Seed Germination Follow-up Experiments:

The studies of characterization of the potential biological effect of this treated water may be studies in which the water is used as a culture medium (for example, for the growth of seaweed) and also in the improvement of the growth of vegetables. So as to illustrate the biological effect, seed germination follow-up experiments have been carried out. The first type of treatment (cited above, with 220 Hz) makes it possible to increase by about 25% the total number of leek seeds that are incubated at 20° C. for each series (cf. FIG. 8). This result is obtained from a mean of 4 series of experiments of 100 seeds to be germinated (cf. error bars in FIG. 8).

Another series of experiments was carried out with dormant oat seeds incubated at a temperature of 30° C. Other types of electromagnetic treatment have been tested on the water that was used to make these seeds germinate. For this type of experiment, an acceleration of the germination kinetics and also an increase of the percentage (from about 25% over about 20 days) of germinated oat seeds, based on the type of treatment applied, have been found.

The invention claimed is:

1. Process for water treatment by means of an electromagnetic field for making the water biologically active, comprising:
providing water for domestic use,
purifying the provided water,
bringing the purified water into the presence of a gas selected from the group consisting of oxygen, nitrogen, carbon dioxide, hydrogen, and argon, and aerosols in a chamber of pure silica,
applying a pulsed, alternating magnetic field to the purified water in the presence of the gas and the aerosols during first time periods of adjustable length, wherein characteristics of the magnetic field are constant for each of said first time periods and vary from one said first time period to the next said first time period, and
applying a pulsed, alternating electric field to the purified water in the presence of the gas and the aerosols during second time periods of adjustable length, wherein characteristics of the electric field are constant for each of said second time periods and vary from one said second time period to the next said second time period, whereby the thus treated water is usable for a biological application.

2. Process according to claim 1, wherein the gas is pure or in a mixture, and introduced into the chamber at a greater pressure and temperature than those of the purified water.

3. Process according to claim 2, wherein the gas comprises argon in a proportion of 0.1 to 90% by total volume and carbon dioxide with a content of between 20 and 3,500 ppm.

4. Process according to claim 1, wherein the aerosols are mineral or organic substances that have a biological action to potentialize solutions of colloidal substances, of anti-oxidants, of vitamins, of amino acids, of omega-3 fatty acids, and hydro-alcoholic solutions of essential oils.

5. Process according to claim 4, wherein content of the mineral or organic substances is between 1 ppt and 1000 ppm; so that a degree of hygrometry in the chamber is between 40 and 100%.

6. Process according to claim 1, wherein the magnetic field has an intensity of between 0.01 G and 10 KG, and the electric field has an intensity of between 1 V/m and 1 KV/m.

7. Process according to claim 1, wherein the magnetic and electric fields have a frequency that is less than 50 KHz.

8. Process according to claim 1, wherein the first time periods and the second time periods have durations that are adjustable between 1 second and 24 hours.

9. Process according to claim 1, further comprising subjecting the purified water in the presence of the gas and aerosols to a polarized electromagnetic radiation whose spectrum extends from ultraviolet to infrared, and whose intensity is at least equal to 1 mW/cm$^2$.

10. Process according to claim 1, wherein the water for domestic use is at a pressure of more than 3 bar, and is purified until having a resistivity of 18.2 MOhms.cm at 25° C. and a total organic compound content that is less than 30 ppb.

* * * * *